United States Patent [19]

Duxbury et al.

[11] Patent Number: 5,040,107
[45] Date of Patent: Aug. 13, 1991

[54] PIPELINED PROCESSOR WITH LOOK-AHEAD MODE OF OPERATION

[75] Inventors: Colin M. Duxbury, Stockport; John R. Eaton, Lancashire; Philip V. Rose, Manchester, all of Great Britain

[73] Assignee: International Computers Limited, London, United Kingdom

[21] Appl. No.: 374,738

[22] Filed: Jul. 3, 1989

[30] Foreign Application Priority Data

Jul. 27, 1988 [GB] United Kingdom ............. 8817912

[51] Int. Cl.⁵ .............................................. G06F 9/42
[52] U.S. Cl. .............................. 364/200; 364/228.7; 364/231.8; 364/948.34; 364/948; 364/948.3; 364/263; 364/262.4
[58] Field of Search ............. 364/200, 228.7, 231.8, 364/242.6, 900, 948.34, 937.01, 948, 948.3, 263, 262.4

[56] References Cited

U.S. PATENT DOCUMENTS

| | | | |
|---|---|---|---|
| 3,949,379 | 4/1976 | Ball | 364/200 |
| 4,200,927 | 4/1980 | Hughes et al. | 364/200 |
| 4,594,655 | 7/1986 | Hao et al. | 364/200 |
| 4,742,451 | 5/1988 | Bruckert et al. | 364/200 |
| 4,760,520 | 7/1988 | Shintani et al. | 364/200 |
| 4,853,840 | 8/1989 | Shibuya | 364/200 |
| 4,858,104 | 8/1989 | Matsuo et al. | 364/200 |

OTHER PUBLICATIONS

Lee, J. and Smith, A., "Branch Prediction Strategies and Branch Target Buffer Design", *IEEE Computer*, Jan. 1984, pp. 6–22.

*Primary Examiner*—Allen R. MacDonald
*Assistant Examiner*—Glenn A. Auve
*Attorney, Agent, or Firm*—Lee, Mann, Smith, McWilliams & Sweeney

[57] ABSTRACT

In a pipelined data processor, when a dependency is detected between a first instruction and a second, subsequent instruction, the second instruction is abandoned. A look-ahead mode of operation is then initiated, in which instructions subsequent to the abandoned instruction are allowed to continue to be executed so as to pre-fetch operands, but are not allowed to be fully executed. The processor has two separate streams of instructions, each of which streams can be independently put into look-ahead mode. When one stream is in look-ahead mode, the other is given priority.

8 Claims, 7 Drawing Sheets

PIPELINED PROCESSOR WITH LOOK-AHEAD MODE OF OPERATION

This invention relates to data processing apparatus of the kind having a series of stages which execute successive instructions in an overlapped manner. Such apparatus is usually referred to as a pipelined processor.

One problem that arises in apparatus of this kind is that the overall speed of operation is reduced by dependencies between successive instructions. For example, an instruction may be held up because it requires to read data from a register that has not yet been written by an earlier instruction.

One object of the present invention is to provide a novel pipelined processor, in which the problem of dependencies is reduced.

SUMMARY OF THE INVENTION

According to the invention, there is provided data processing apparatus comprising:
  (a) a plurality of pipeline stages for executing a sequence of instructions in a pipelined manner,
  (b) means operative upon detection of a dependency between a first instruction and a second, subsequent instruction, for causing the second instruction to be abandoned, and for initiating a look-ahead mode of operation,
  (c) means operative in the look-ahead mode, for allowing instructions subsequent to the abandoned instruction to continue to be executed so as to prefetch any operands for those instructions, but not to be fully executed, and
  (d) means for terminating the look-ahead mode and for re-starting execution at the abandoned instruction.

BRIEF DESCRIPTION OF THE DRAWINGS

One processing apparatus in accordance with the invention will now be described by way of example with reference to the accompanying drawings.

DESCRIPTION OF AN EMBODIMENT OF THE INVENTION

Overall description of System

Figure 1:
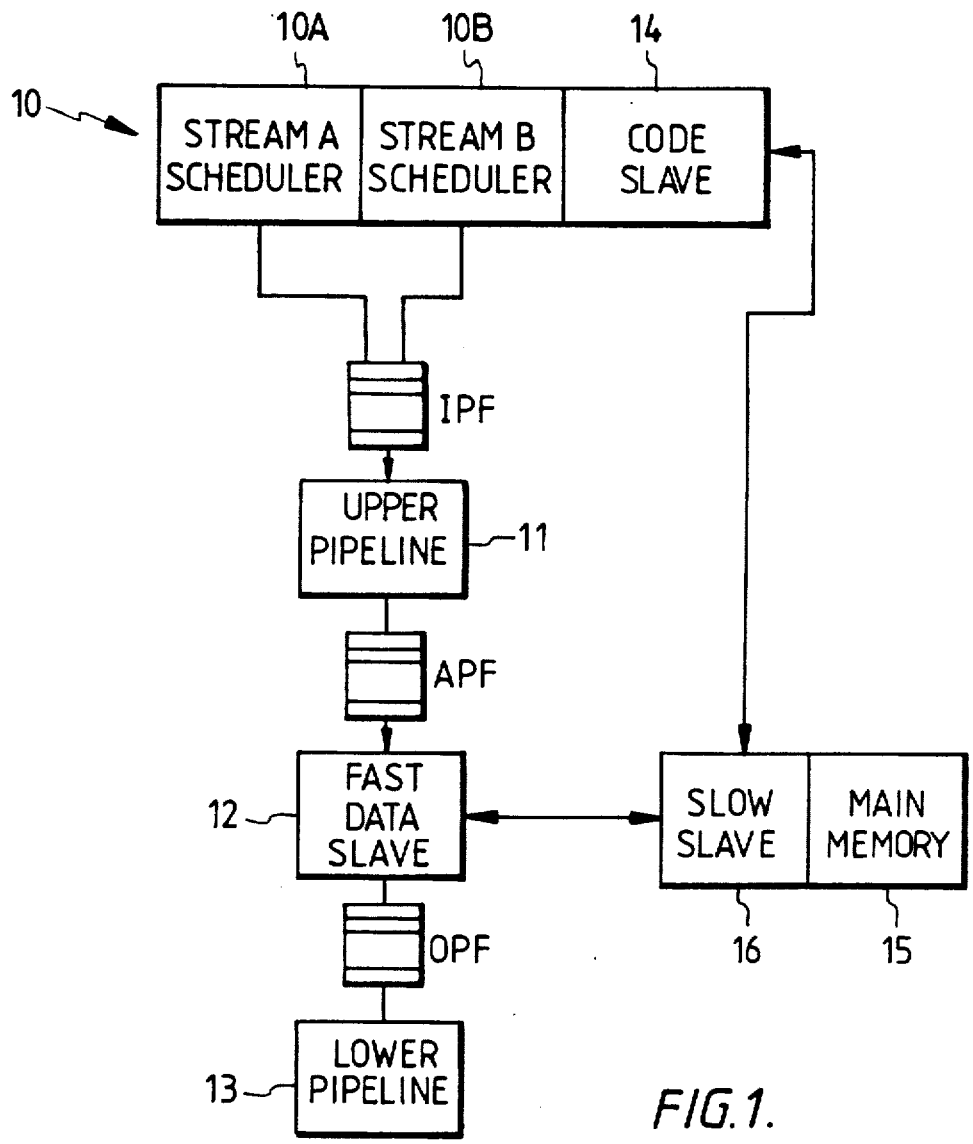
FIG. 1 is an overall diagram of the apparatus.

Referring to FIG. 1, the data processing apparatus comprises a series of pipeline units as follows: an instruction scheduler 10, an upper pipeline unit 11, a fast data slave store 12, and a lower pipeline unit 13.

The pipeline units 10-13 are interconnected by parameter files as follows:
  an instruction parameter file IPF, an address parameter file APF, and an operand parameter file OPF. These allow instruction parameters to be passed between the pipeline units.

The scheduler 10 has a fast code slave 14 associated with it, for holding copies of instructions for access by the scheduler.

The system also includes a main store 15 of larger size but slower access speed than the slave stores, 12, 14, and a slow slave store 16 of size and speed intermediate between those of the main store and the fast slaves. The fast slaves, the slow slave, and the main store form a three-level storage hierarchy.

The scheduler 10 comprises two scheduler units 10A and 10B, for scheduling two separate streams of instructions, referred to as stream A and stream B. Stream A is dedicated to the main processing workload of the system. Stream B handles events that are independent of this main processing workload, such as managing input-/output activity, and communication with other processors. The provision of two independent streams allows more effective use of the hardware of the system. For example, as will be shown, when one stream is held up for some reason, the other stream can continue processing, so that the hardware is not idle.

Each of the scheduler units 10A, 10B generates a sequence of instruction addresses, for retrieving instructions from the code slave 14. If the required instruction is not in the code slave, it is retrieved from the slow slave 16 or from the main store 15. The retrieved instructions are written into the IPF. Each instruction is accompanied by a program counter value PC which is also written into a portion of the IPF referred to as IPF.pc. The IPF has dual ports, so that the scheduler units 10A, 10B can load the IPF simultaneously.

Each of the parameter files IPF, APF and OPF (as well as another parameter file TPF to be described later) comprises sixteen registers, and can therefore hold parameters for up to sixteen different instructions at various stages of execution. The set of registers relating to a particular instruction is referred to as a slot: that is, each slot comprises a corresponding register from each of the register files.

Ten of the slots are allocated to stream A and six to stream B.

When an instruction is initially entered into the IPF from the scheduler, it is assigned a slot i.e. it is assigned a register in IPF and a corresponding register in each of the other parameter files. The instruction then retains this slot until it has been successfully executed by all stages of each pipeline unit, whereupon the slot is released so that it is available for another instruction from the scheduler. As an instruction passes down the pipeline, the slot number assigned to that instruction is passed down the pipeline with it, so that at each pipeline stage the appropriate register in the parameter file can be accessed.

The upper pipeline 11 reads instructions from the IPF and processes them, so as to calculate the address of the required operand for the instruction. This may, for example, involve adding a displacement value to a base address held in an internal register, such as a local name base register. Alternatively, the address may be a literal value held in the instruction. The operand address is placed in the APF in the slot appropriate to the instruction in question.

The data slave 12, when it is free, reads an address from the APF and retrieves the required operand, if it is present in the data slave, or alternatively initiates fetching of the operand from the slow slave or the main store. The retrieved operand is placed in the OPF in the slot appropriate to the instruction in question. Additionally, data from the slave may be returned to the upper pipeline so as to update one of the internal registers in that unit.

The lower pipeline 13 reads the operand from the OPF and performs the required operation on it as specified by the instruction. For example, this may involve adding the operand to the contents of an accumulator register.

Upper Pipeline

Figure 2:
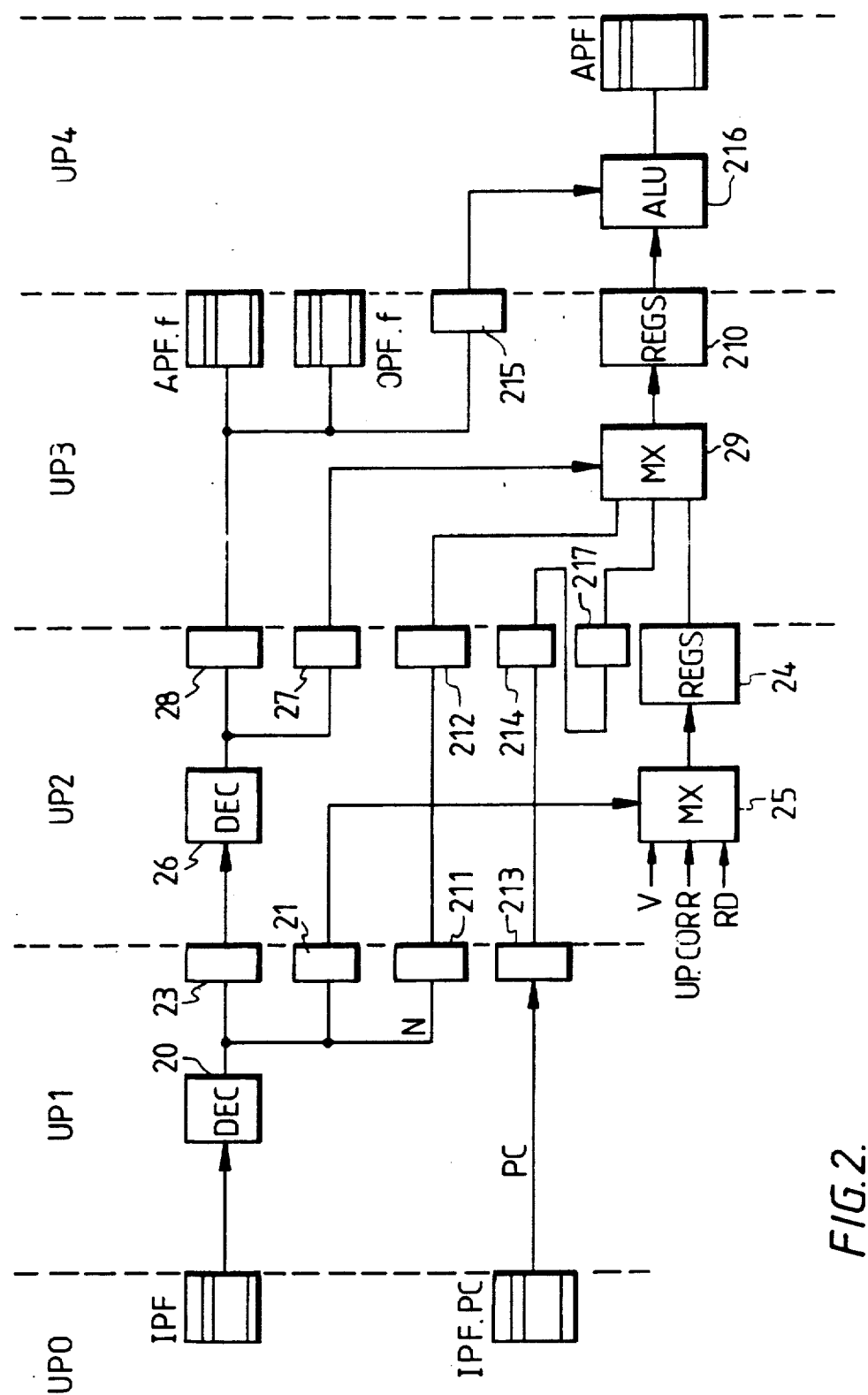
FIG. 2 shows an upper pipeline unit in more detail.

Referring now to FIG. 2, this shows the upper pipeline unit 11 in more detail.

The upper pipeline unit includes five pipeline stages referred to as UP0–UP4.

The first stage UP0 contains logic, to be described below, for selecting a slot from the IPF, so as to initiate processing of the instruction in that slot.

Normally, instructions in each stream are started in the upper pipeline in chronological order. Also normally, stream A is given priority over stream B, so that a B-stream instruction is started only if there are no A-stream instructions available in IPF. However, stream B may be given priority in certain circumstances.

After an instruction has been started, the upper pipeline may detect that the instruction cannot be successfully completed yet, because of a dependency on an earlier instruction. In this case, the instruction is abandoned. However instructions following the abandoned instruction are allowed to continue running in a special mode called look-ahead mode, the purpose of which is to allow operands for the instruction to be prefetched, if necessary, into the fast data slave. Such look aheads are allowed only if they do not generate any further dependencies. The look-ahead mode can be initiated for streams A and B independently. When stream A is in look-ahead mode but not stream B, then stream B is given priority. When the dependency has been resolved, the stream is returned to normal non-look-ahead mode, and the abandoned instruction is restarted in the upper pipeline.

UP1 comprises a decoder 20 which decodes the instruction from the selected slot to generate control signals for UP2, these being stored in a pipeline register 21. The decoder 20 also produces an output signal which is passed to UP2 for further decoding, by way of a register 23.

UP2 contains a set of registers 24 which represent local copies of the registers specified by the instruction set of the system. The definitive copies of these registers are actually in the lower pipeline. UP2 also contains a multiplexing circuit 25, which is controlled by the value in register 21, and which selects input data for the registers 24 from one of the following sources:

(a) An output data signal V from the lower pipeline.
(b) A corrected register value UP.CORR from the lower pipeline.
(c) A data signal RD from the data slave.

UP2 also contains a decoder 26 which further decodes the contents of register 23 to produce a set of control signals for UP3, these being stored in a register 27. The decoder also produces a function code F which is stored in a register 28.

UP3 comprises a multiplexing circuit 29 which selects input data for a set of arithmetic registers 210, under control of the value in register 27. The input data is selected from the following sources:

(a) A literal value N, which is obtained from the decoder 20 in UP1 by way of pipeline registers 211, 212.
(b) A program counter value PC, which is obtained from IPF.pc by way of pipeline registers 213, 214, and 217.
(c) The registers 24.

UP3 also contains a register 215 which passes the function code F to UP4. The function code F is also passed from UP3 to the parameter files APF and OPF where it is stored in the appropriate slot. The portions of these parameter files which store the function code are referred to as APF.F and OPF.F.

UP4 contains an arithmetic and logic unit (ALU) 216, which performs an operation on the contents of the registers 210 under control of the function code F in the register 215. The result of the operation is passed to the APF, where it is written into the appropriate slot.

In a further stage UP5 (not shown), the address generated in UP4 may be checked for architectural validity. Any error will cause a later unsuccessful termination of this slot.

Data Slave

Figure 3:
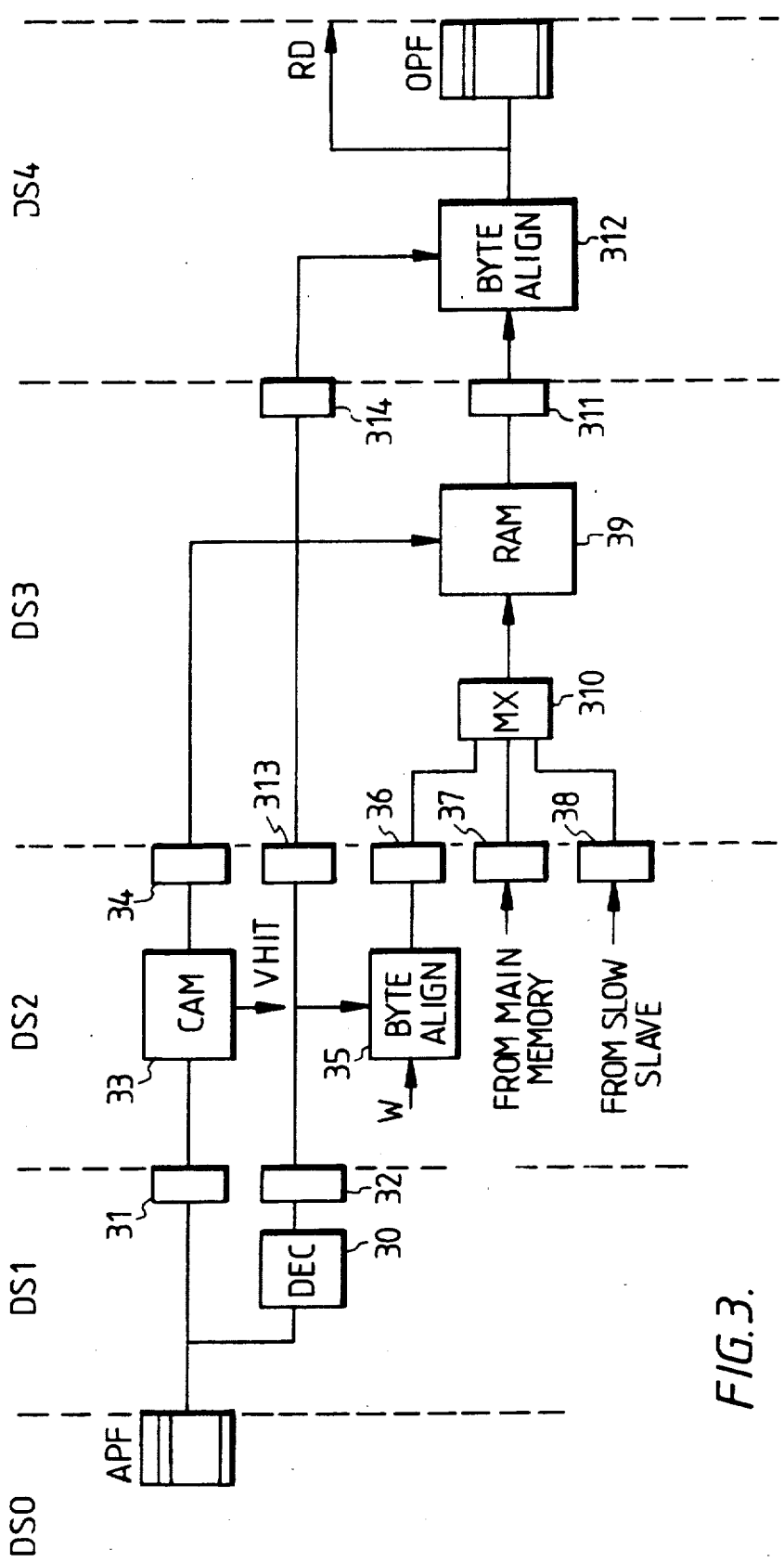
FIG. 3 shows a fast data slave store in more detail.

Referring now to FIG. 3, this shows the fast data slave 12 in more detail.

The data slave includes five pipeline stages DS0–DS4.

The first stage DS0 comprises a priority logic circuit for selecting the next slot from the APF to be handled by the data slave.

DS1 contains a decoder 30 which decodes the address selected from APF, to produce a byte shift value indicating the alignment of the required data item within a 32-byte block. The address and the byte shift value are passed to DS2 by way of registers 31 and 32.

DS2 comprises a contents—addressable memory (CAM) 33, which holds the addresses of data items currently in the data slave. The CAM 33 receives the operand address from DS1, and compares it with all the addresses held in the CAM. If there is a match, the CAM produces a signal VHIT, and at the same time outputs a tag value indicating which 32-byte block of the data slave the required item is held in. The tag value is passed to DS3 by way of a register 34.

If the required data item is not in the data slave (VHIT false), the data slave triggers an access to the slow slave, which will cause the data to be fetched, either from the slow slave or the main store, and loaded into the data slave.

The DS2 also includes a byte alignment circuit 35 which receives a data item W from the lower pipeline and aligns it according to the byte shift value held in the register 32. The aligned data item is stored in a register 36. DS2 also includes registers 37 and 38 which receive data items returned to the data slave from the main store and slow slave respectively.

DS3 comprises a random-access memory (RAM) 39 which holds a number of individually addressable 32-byte blocks of data. The RAM is addressed by the tag value from register 34. Data can be written into the RAM, by way of a multiplexer 310, from any of the registers 36, 37 and 38. Alternatively, a block of data can be read out of the RAM and passed to DS4 by way of a register 311.

DS4 comprises a byte alignment circuit 312. This is controlled by a byte shift value, received from the decoder 40 by way of pipeline registers 32, 313 and 314.

The alignment circuit 312 selects the required data item from the block held in register 311, and passes it to the OPF. The selected data item is also supplied to the upper and lower pipelines as data signal RD.

Lower Pipeline

Figure 4:
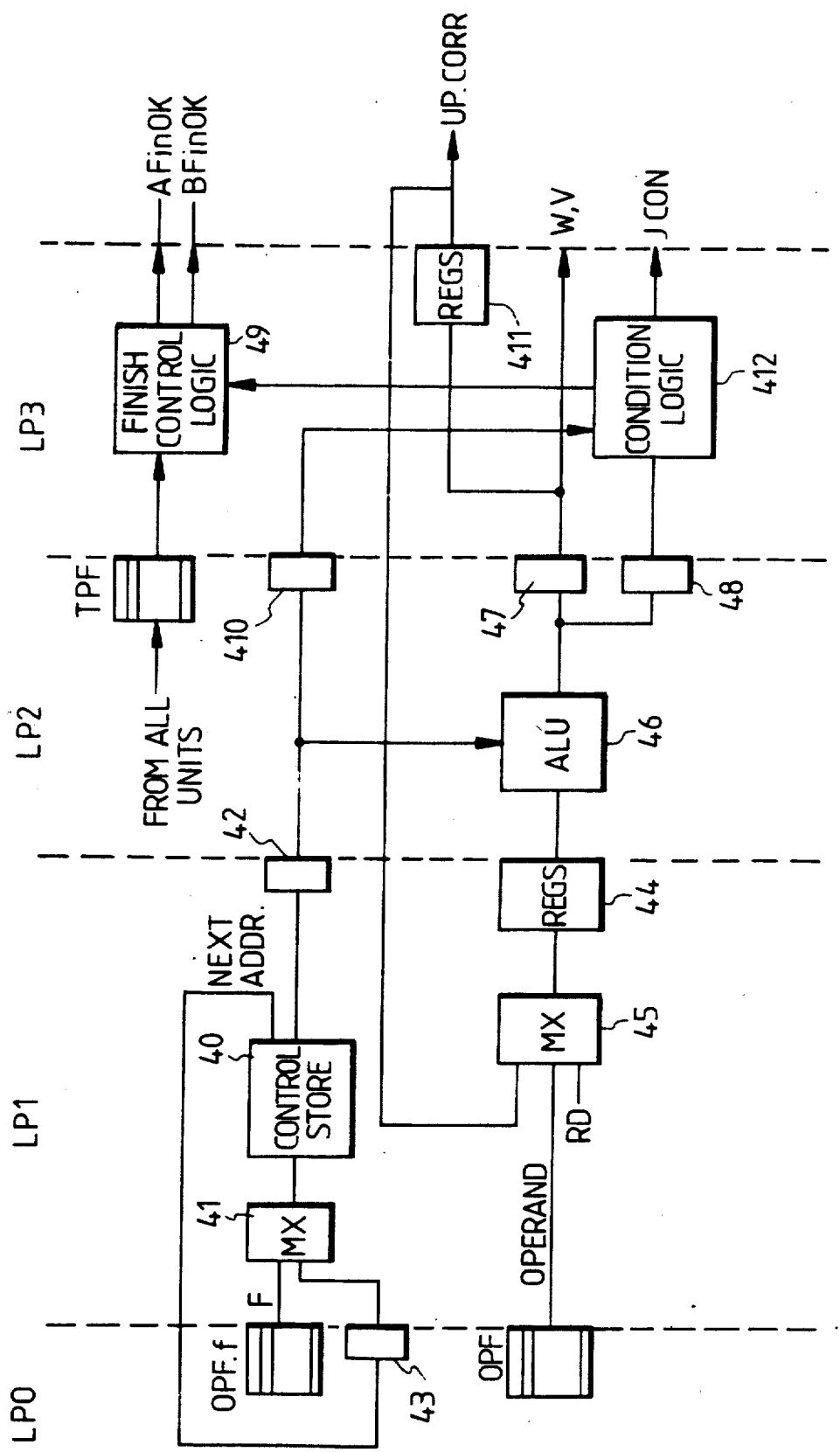
FIG. 4 shows a lower pipeline unit in more detail.

Referring now to FIG. 4, this shows the lower pipeline 13 in more detail.

The lower pipeline includes four pipeline stages LP0-LP3.

The first stage LP0 contains a priority logic, to be described, for selecting the next slot from OPF to be handled by the lower pipeline.

Within each stream, instructions are started, (and hence finish) in strict chronological order, starting with the eldest.

The execution of an instruction in the lower pipeline may be started as soon as it is certain that the operand for it will be available from the data slave in time for use at stage LP2 of the lower pipeline. Thus, an instruction may be started in the lower pipeline while the data item is actually being retrieved from the data slave. In the limiting case, the data signal RD from the data slave is used directly in LP1, bypassing OPF. Hence, operations of the pipeline stages of the data slave and the lower pipeline can be overlapped. This is important, since it reduces the total transit time of instructions through the overall pipeline.

LP1 comprises a control store 40 having an address input which receives the function code F from the selected slot of OPF.f, by way of a multiplexer 41. The output of the control store 40 comprises a control code, and a next address value. The control code is passed to LP2 by way of a register 42. The next address value is fed back to a register 43 in LP0, and can then be selected by the multiplexer 41 so as to address another location in the control store 40. Thus it can be seen that, for each function code F, the control store 40 can produce a sequence of control codes for the lower pipeline. At the end of the sequence of control codes, the control store produces an end of sequence signal, which tells the priority logic in stage LP0 to select a new slot, and switches the multiplexer 41 so as to select the next function code from OPF.f, thus initiating a new sequence.

LP1 also includes a set of arithmetic registers 44. Data can be loaded into these registers by way of a multiplexing circuit 45 from either the following sources:

(a) The operand held in the currently selected slot of the OPF.
(b) Data from the registers in LP3
(c) Slave data RD directly from the data slave (OPF bypass)

Multiplexer 45 can also take bypass data from registers 47 or ALU 46, where that data has not yet been written into the required register 411.

LP2 comprises an arithmetic and logic unit (ALU) 46 which performs an operation on the contents of registers 44 as specified by the control held in register 42. The result of this operation is passed to LP3 by way of registers 47 and 48.

LP2 also contains another parameter file, referred to as the termination parameter file TPF. Like the other parameter files, TPF comprises sixteen registers, one for each slot. Whenever an instruction detects a problem in execution in any of the pipeline units, an indicator is set in the slot of TPF corresponding to that instruction.

LP3 includes a condition logic circuit 412 which receives the output of the register 48 and a control signal from the control store 40 by way of registers 42 and 410. The circuit 412 performs tests to detect whether a jump condition specified by the instruction has been satisfied, e.g. whether an accumulator register is zero. If the jump condition is satisfied, the circuit 412 produces a jump signal JCON for the scheduler 10.

LP3 contains finish logic 49, which receives a control signal from the condition logic 412 to indicate whether any problems have been detected during execution in LP2. The logic 49 examines the signal and the contents of TPF corresponding to the instruction, and determines whether this instruction has encountered any problems during execution. When successful completion is detected, the circuit produces one of two signals AFinOK or BFinOK, depending on which stream the instruction is in. The slot allocated to the instruction is then released for re-use.

LP3 also includes a set of registers 411 which represents the definitive copies of the registers specified by the instruction set of the system. These registers receive data from the register 47. The registers 411 are loaded from register 47 only when the finish logic 49 indicates that this slot is completing successfully. In this way, the current process state, as defined in registers 411, is not corrupted by any errors in the execution of an instruction. The output of the registers 411 provides the correction signal UP.CORR which can be fed back to the upper pipeline if required, to correct the local copies of the registers held there.

The output of the register 47 also provides the signal W to the data slave, and the signal V to the upper pipeline.

Slot pointers

Figure 5:
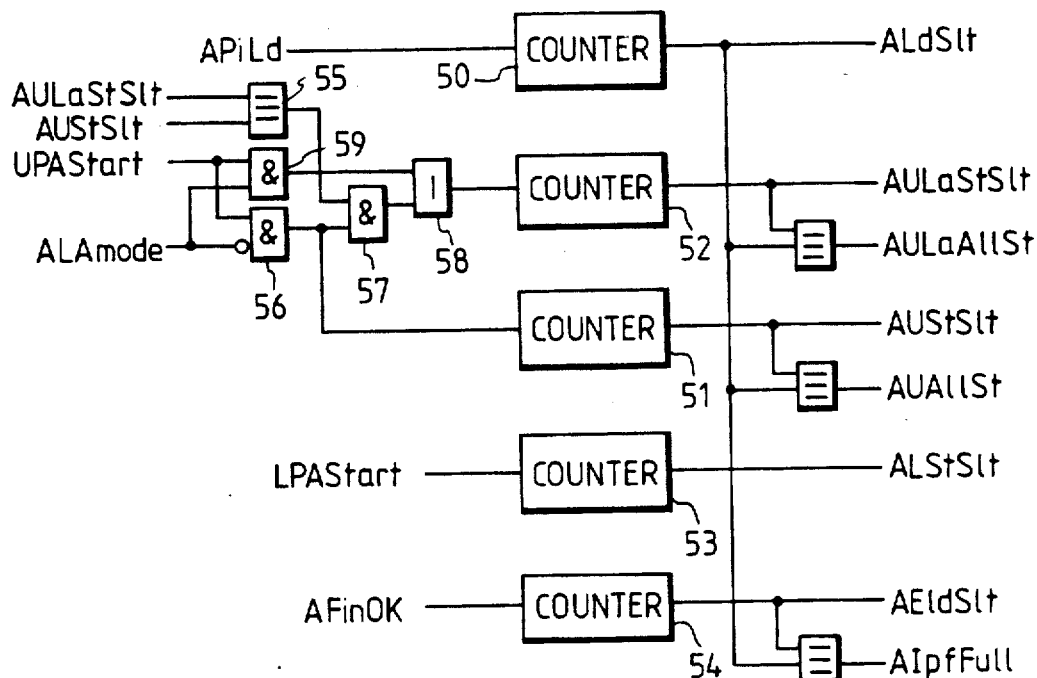
FIG. 5 shows slot pointers for controlling the flow of instructions through the pipeline units.

Referring now to FIG. 5, the flow of A-stream instructions through the pipeline is controlled by a plurality of counters 50-54. A similar set of counters (not shown) is provided for the B-stream.

Counter 50 produces a signal ALdSlt which indicates the next slot in the IPF to be loaded by an A-stream instruction from the scheduler. The counter 50 is incremented by a signal APiLd whenever an A-stream instruction is loaded into the IPF. Thus the slots in the IPF are allocated sequentially to successive instructions.

Counter 51 produces a signal AUStSlt which indicates the next A-stream slot to be started in the upper pipeline UP in normal mode (i.e. non-look-ahead mode). Similarly, counter 52 produces a signal AULaStSlt which indicates the next A-stream slot to be started in the upper pipeline in look-ahead mode.

Initially, the contents of both the counters 51, 52 are equal, this condition being detected by an equivalence gate 55.

In normal mode, a look-ahead signal ALAmode is false. Each time an A-stream instruction is started in the upper pipeline, a signal UPAStart goes true. This enables an AND gate 56, which increments the counter 51. Thus, in normal mode, the counter 51 selects A-stream instructions from successive slots of the IPF, so as to initiate processing of these instructions in the upper pipeline. At the same time, an AND gate 57 and an OR gate 58 are enabled, which increments the counter 52. Thus, while the system remains in normal mode, the two counters 51, 52 are incremented in step with each other.

In look-ahead mode, ALAmode is true, and so the AND gate 56 is disabled, which prevents the counter 51 from being incremented. Each time a new A-stream instruction is started in look-ahead mode, an AND gate 59 is enabled, and this increments the counter 52. Thus, in look-ahead mode, the counter 52 continues counting, so as to continue to select successive instructions from the IPF for starting in the upper pipeline. The counter 51, on the other hand, retains the slot number of the instruction which was abandoned.

When the system returns to normal mode, ALAmode goes false again. Thus, each time a new instruction is started in the upper pipeline, the AND gate 56 is enabled, and the counter 51 is incremented. However, while the contents of the counters are unequal, the AND gate 57 remains inhibited and this prevents the counter 52 from being incremented. When the counter 51 eventually catches up with counter 52, both counters will again be incremented in step with each other. If another look ahead is initiated before the counter 51 has caught up, those instructions that have already run in look-ahead mode will not do so again, since look-ahead starts from the current value of counter 52.

Counter 53 produces a signal ALStSlt which indicates the next A-stream slot to be started in the lower pipeline LP. This counter 53 is incremented by a signal LPAStart whenever an A-stream instruction is started in the lower pipeline. Thus, the instructions are started sequentially in the lower pipeline.

The counter 54 produces a signal AEldSlt which indicates the slot holding the eldest A-stream instruction currently in the pipeline. Instructions are completed in strictly chronological order, and hence this signal indicates the next A-stream instruction which is due to finish execution in the lower pipeline. The counter 54 is incremented by a signal AFinOK which indicates that an A-stream instruction has successfully completed execution in the lower pipeline. This releases the slot.

The contents of the counters 50 and 51 are compared, to produce a signal AUAllSt, which indicates that all the A-stream instructions currently in the IPF have now been started in normal mode. Similarly, the contents of the counters 50 and 52 are compared, to produce a signal AULaAllSt, which indicates that all the A-stream instructions currently in the IPF have now been started, with possibly some of them in look-ahead mode.

The contents of the counters 50 and 54 are compared to produce a signal AIpfFull which indicates that all the A-stream slots in the IPF are now full. This prevents any further A-stream instructions from being loaded into the IPF.

Upper pipeline start controls

Figure 6:
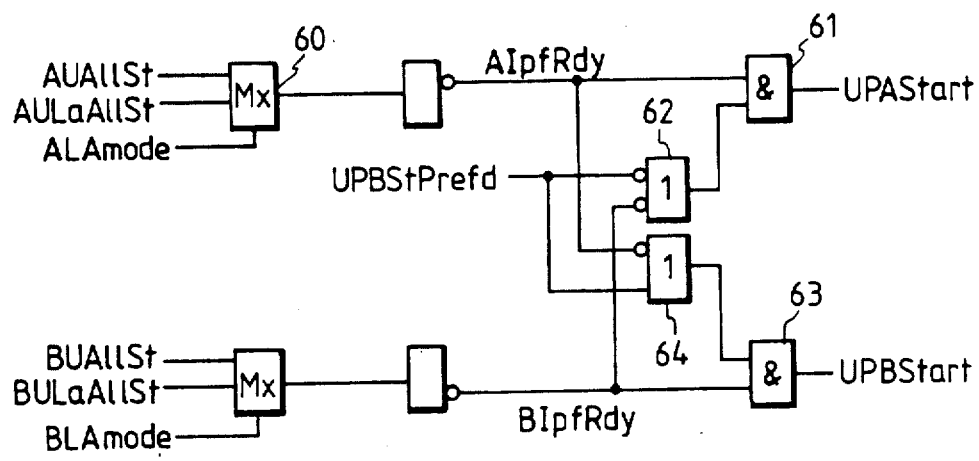
FIG. 6 to 8 show control logic for controlling the initiation of instructions in the upper pipeline.
Figure 7:
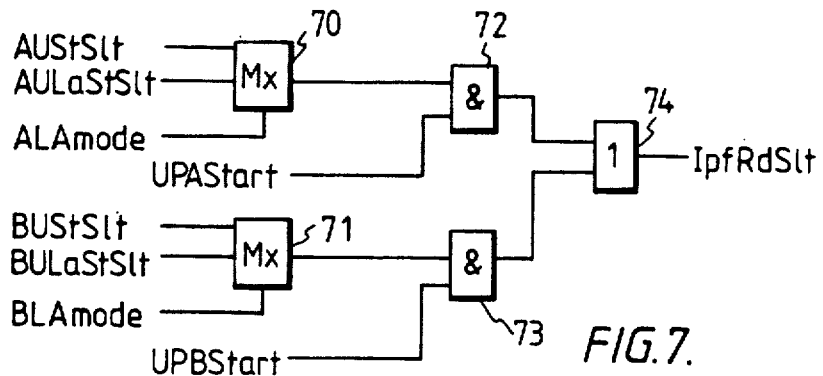
Figure 8:
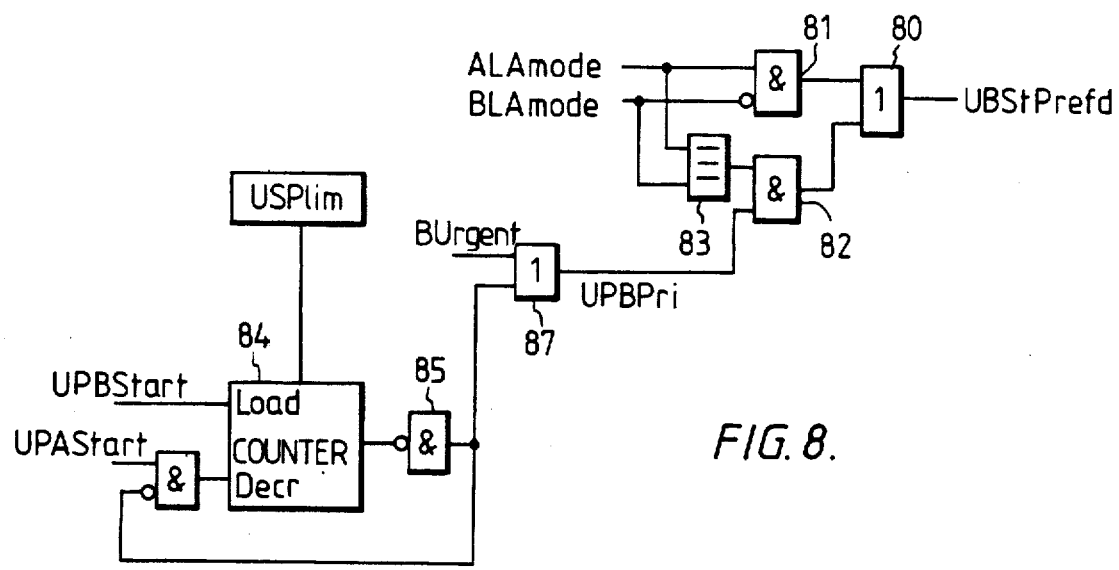

FIG. 6 to 8 show the control logic for starting instructions in the upper pipeline.

Referring to FIG. 6, a multiplexer 60 selects either AUAllSt or AULaAllSt according to whether the signal ALAmode is false or true. The inverse of the output of the multiplexer 60 provides a signal AIpfRdy which indicates that there is at least one A-stream instruction in the IPF ready to be started in the upper pipeline. A similar signal BIpfRdy is produced for the B-stream.

The signal AIpfRdy is fed to one input of an AND gate 61, which produces a signal UPAStart, for initiating an A-stream instruction in the upper pipeline. The other input of this AND gate receives the output of an OR gate 62, which receives the inverse of BIpfRdy and the inverse of a priority signal UPBStPrefd.

Similarly, BIpfRdy is fed to one input of an AND gate 63, which produces a signal UPBStart, for initiating a B-stream instruction in the upper pipeline. The other input of this AND gate receives the output of an OR gate 64, which receives UPBStPrefd and the inverse AIpfRdy.

Thus it can be seen that, when UPBStPrefd is false, A-stream instructions are initiated in preference to B-stream instructions: a B-stream instruction can be initiated only if there are no A-stream instructions ready. Conversely, when UPBStPrefd is true, B-stream instructions are initiated in preference to A-stream instructions.

Referring to FIG. 7, a multiplexer 70 selects either AUStSlt or AULaStSlt according to whether ALAmode is false or true. The output of this multiplexer therefore indicates the slot number of the next A-stream instruction to be started in the upper pipeline, in normal or look-ahead mode as the case may be. A similar multiplexer 71 is provided for the B-stream.

The outputs of the multiplexers are gated by way of AND gates 72, 73 to an OR gate 74, the output of which provides a signal IpfRdSlt. This signal is used to address the IPF, for reading out the next instruction for starting in the upper pipeline. The AND gates 72, 73 are controlled by signals UPAStart and UPBStart as shown, so as to select the slot number for the A stream or B stream as required.

Referring now to FIG. 8, this shows the logic for producing the signal UPBStPrefd which indicates that the B stream is preferred for starting in the upper pipeline.

UPBStPrefd is derived from an OR gate 80 which receives the output of two AND gates 81 and 82. AND gate 81 receives the signal ALAmode and the inverse of the corresponding signal BLAmode for the B-stream. Gate 82 receives a signal UPBPri, and the output of an equivalence gate 83, which combines ALAmode and BLAmode. Thus, it can be seen that if one of the two stream is in look-ahead mode, and the other is in normal mode, the signal UPBStPrefd gives preference to the stream that is in normal mode. If, on the other hand, both streams are in the same mode, then preference is given to the A stream or the B stream according to whether UPBPri is false or true.

The signal UPBPri is produced as follows.

A counter 84 is loaded with a preset value USPlim whenever a B-stream instruction is started in the upper pipeline, as indicated by UPBStart. The counter is then decremented whenever an A-stream instruction is started, as indicated by UPAStart. When the count reaches zero an AND gate 85 is enabled, which in turn enables OR gate 87, so as to make UPBPri true. Thus, it can be seen that the A stream is normally given priority, but the B stream is given priority if a predetermined number of A-stream instructions are started without any corresponding B-stream starts. The values of USPlim can be preset to a value such as to achieve a desired balance between the two streams.

The OR gate 87 also receives a signal BUrgent, which gives priority to the B-stream when pending input/output activity or inter-processor communication has become critical, over-riding the effect of the counter 84.

Look-ahead control logic

As mentioned above, if it is detected that an instruction cannot be completed yet because of a dependency on an earlier instruction, it is abandoned, and a look-ahead mode is initiated.

Figure 9:
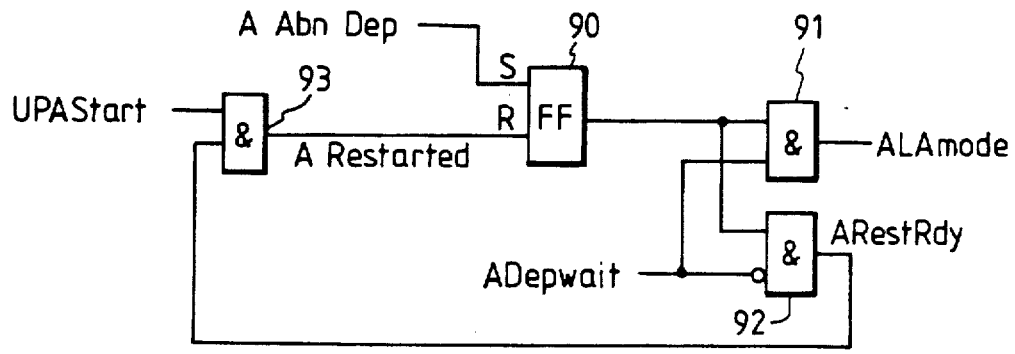
FIG. 9 shows look-ahead mode control logic.

Referring to FIG. 9, this shows the logic for controlling the look ahead mode.

If the instruction to be abandoned is in the A-stream, signals AAbnDep and ADepWait are produced. AAbnDep sets a flip flop 90. The output of this flip flop, along with ADepWait, then enables an AND gate 91, to produce the signal ALAmode, which puts the A stream into look-ahead mode.

As described above, in look-ahead mode, instructions continue to be initiated, under control of the counter 52 (FIG. 5). Thus, instructions following the abandoned instruction are allowed to continue running, so as to prefetch operands, if necessary. However, these instructions are not allowed to terminate successfully, or to update the definitive copies of the register in the lower pipeline.

The signal ADepWait goes false again when it is detected that the dependency has now been resolved, or is likely to be resolved shortly. This disables AND gate 91, making ALAmode false, and at the same time enables an AND gate 92, producing a signal ARestRdy.

Since ALAmode is now false, the next A stream instruction to be initiated will be the instruction in the slot indicated by AUStSlt. In other words, the instruction that was abandoned because of the dependency will now be restarted.

When the instruction is restarted, the signals UPAStart and ARestRdy enable an AND gate 93, producing a signal ARestarted, which resets the flip flop 90.

Similar logic (not shown) exists for generating the signal BLAmode for the B stream.

It should be noted that an abandoned instruction may be restarted before the dependency has actually been resolved. For example, consider the case where an instruction has been abandoned because it requires to read data from a register that has not yet been written from the slave output data RD of an earlier instruction. In this case, the signal ADepWait will go false as soon as an access is initiated in the data slave to retrieve the required data. Thus, the restarted instruction will start running in the upper pipeline in parallel with the access to the data slave by the earlier instruction. By the time the restarted instruction requires to read the data, it is likely that the data will have been accessed from the data slave, and so execution will proceed normally. However, if the required data is not in the data slave, the restarted instruction will be abandoned again, and look-ahead mode is re-activated.

Lower pipeline start controls

Figure 10:
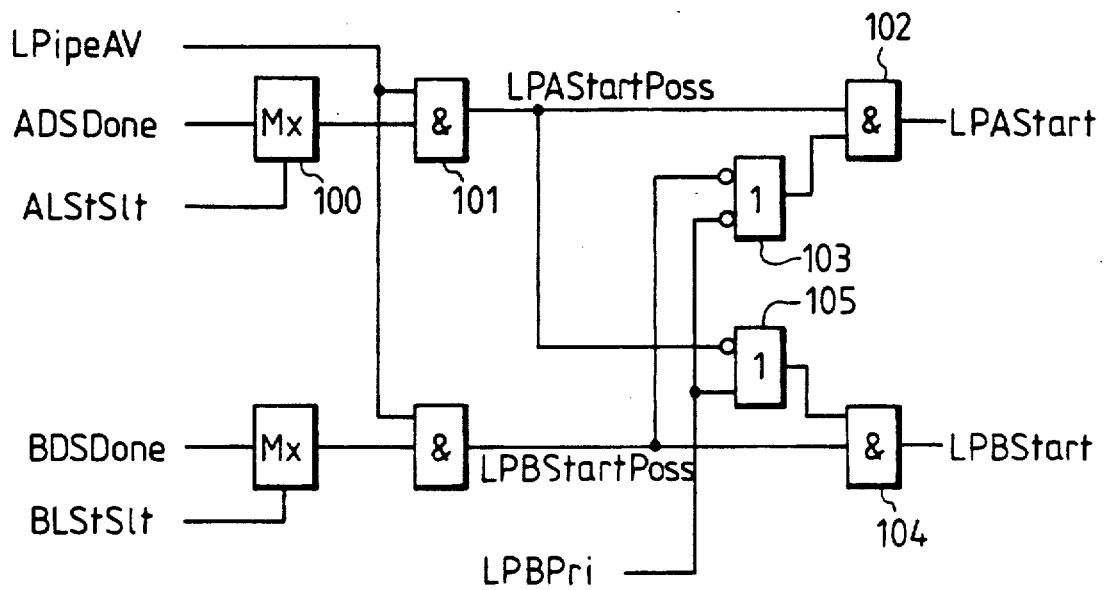
FIG. 10 and 11 show control logic for controlling the initiation of instructions in the lower pipeline.
Figure 11:
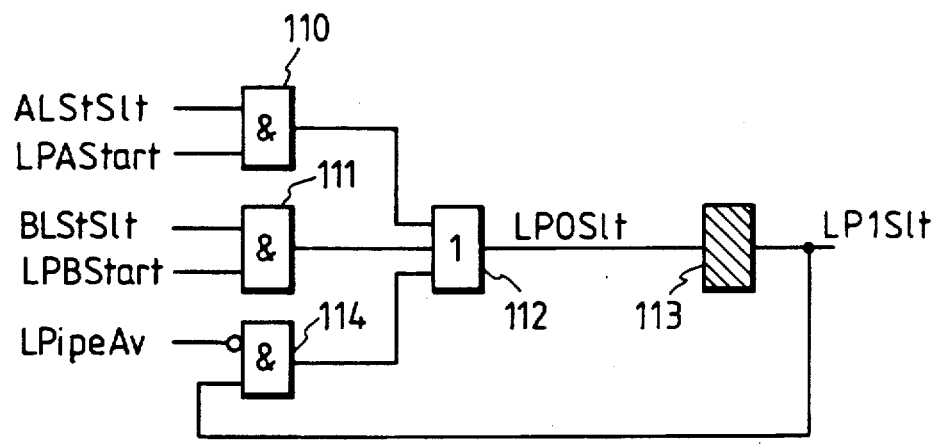

FIGS. 10 and 11 show the control logic for starting instructions in the lower pipeline LP.

Referring to FIG. 10, when the first stage LP0 of the lower pipeline is available to start executing an instruction, a signal LPipeAv is produced.

A signal ADsDone is produced, to indicate that the required data slave access (if any) for the A stream has been completed or is expected to be completed shortly. This signal consists of ten bits, one for each a stream slot. These ten bits are applied to a multiplexer 100, which selects the bit corresponding to the next A-stream instruction to be started in the lower pipeline, as indicated by ALStSlt.

The signal LPipeAv, and the output of the multiplexer 100 are combined in an AND gate 101 to produce a signal LPAStartPoss, which indicates that it is now possible to start a new A-stream instruction in the lower pipeline.

Similar logic exists as shown to produce a corresponding signal LPBStartPoss for B stream.

The signal LPAStartPoss is applied to one input of an AND gate 102, which produces a signal LPAStart, indicating that an A-stream instruction is to be started in the lower pipeline. The other input of this AND gate receives the output of an OR gate 103, the inputs of which receive the inverse of LPBStartPoss and the inverse of a priority control signal LPBPri.

Similarly, the signal LPBStartPoss is applied to one input of an AND gate 104, which produces a signal LPBStart, indicating that a B-stream instruction is to be started in the lower pipeline. The other input of this AND gate receives the output of an OR gate 105, the inputs of which receive the signal LPBPri and the inverse of LPAStartPoss.

Thus, it can be seen that, if LPBPri is false, then an A-stream instruction is started whenever possible, in preference to a B-stream instruction. If LPBPri is true, then the B-stream instructions are given preference.

The priority signal LPBPri is produced by a logic circuit similar to the circuit shown in FIG. 8 for producing UPBPri. In this case, the counter is controlled by signals LPAStart and LPBStart, and the preset count value is LSPLim, which may be different from USPLim.

It should be noted that the signals ADsDone and BDsDone can be produced as soon as the data slave knows it will be able to provide the requested data item without recourse to the slow slave or main store. In practice, the signals are produced at the same time as the data slave is being accessed. This means that the operation of the lower pipeline may be overlapped with the operation of the slave store, if production of ADsDone or BDsDone results in an immediate LPAStrt or LPBStart for the same slot.

Referring now to FIG. 11, this shows the logic for selecting the slot to be initiated in the lower pipeline.

The signal ALStSlt, indicating the next A-stream slot to be started in the lower pipeline, is gated with LPAStart in a set of AND gates 110. Similarly, BLStSlt is gated with LPBStart in a set of AND gates 111.

The outputs of gates 110 and 111 are combined in a set of OR gates 112, to produce a signal LP0Slt, which indicates the slot number of the next instruction, in the A-stream or B-stream as the case may be, to be started in the lower pipeline. LP0Slt is used to access the parameter file OPF so as to read out the required instruction and operand for the lower pipeline.

The signal LP0Slt is stored in a register 113 when the instruction enters stage LP1 of the lower pipeline, to produce a signal LP1Slt. This signal is gated back to the OR gates 112, by way of a set of AND gates 114, whenever LPipeAv is false. Thus, if the lower pipeline is not available to receive a new instruction (because it is executing a multi-beat instruction) the current slot number is maintained.

It should be noted that, for each instruction, all changes to the process state are made at the same time, upon successful termination in state LP3. Thus, instructions can be considered atomic, being executed either in full or not at all. This simplifies control and recovery of the pipeline on jumps and errors.

We claim:

1. Data processing apparatus comprising:
   (a) a plurality of pipeline stages connected in series, for executing a sequence of instructions in a pipelined manner,
   (b) control means connected to said pipeline stages and operative upon detection of a dependency between a first instruction and a second, subsequent instruction, for causing the second instruction to be abandoned, and for initiating a look-ahead mode of operation,
   (c) means connected to said pipeline stages and to said control means, and operative in the look-ahead mode, for allowing instructions subsequent to said second instruction to continue to be executed so as to prefetch any operands for those instructions, but not to be fully executed, and
   (d) means connected to said pipeline stages and to said control means, for terminating the look-ahead mode and returning to a normal mode of operation when said dependency is resolved, and for re-starting execution at said second instruction.

2. Apparatus according to claim 1 including means connected to said pipeline stages and to said control means, for terminating said look-ahead mode when said dependency is about to be resolved.

3. Apparatus according to claim 2 including a data slave store connected to said pipeline stages and means connected to said pipeline stages and to said control means, and operative to terminate the look-ahead mode when a data slave store access is initiated to retrieve data required for resolving the dependency, but before the data is actually available.

4. Apparatus according to claim 1, further including:
   (a) first counter means for indicating a next instruction to be started in normal mode,
   (b) second counter means for indicating a next instruction to be started in look-ahead mode,
   (c) means connected to the first and second counters and to said control means, for incrementing both counters in step with each other while the counters are equal in normal mode,
   (d) ;means connected to the second counter and to said control means, for incrementing only the second counter in look-ahead mode, and
   (e) means connected to the first counter and to said control means, and operative on return to normal mode for incrementing only the first counter, until said first counter is again equal to the second counter.

5. Apparatus according to claim 1, further including means connected to said pipeline stages, for initiating first and second independent streams of instructions, and means connected to said pipeline stages and to said control means, for placing each stream independently into said look-ahead mode.

6. Apparatus according to claim 5, including means connected to said control means and operative when one stream is in the look-ahead mode and the other is in the normal mode, for giving the stream in the normal mode execution priority over the other stream.

7. A method of processing data, the method comprising steps as follows:
   (a) executing a sequence of instructions in an overlapped manner,
   (b) monitoring the instructions for dependencies between the instructions,
   (c) upon detection of a dependency between a first instruction and a second, subsequent instruction, abandoning the second instruction and initiating a look-ahead mode of operation,
   (d) in the look-ahead mode of operation, continuing to execute instructions subsequent to said second instruction, to prefetch operands for said instructions subsequent to said second instruction, without fully executing said instructions subsequent to said second instruction, and
   (e) when the dependency is about to be resolved, terminating the look-ahead mode of operation and re-starting execution at said second instruction.

8. Data processing apparatus comprising:
   (a) a plurality of pipeline stages connected in series, for executing a sequence of instructions in a pipelined manner,
   (b) a data slave store, connected to the pipeline stages, for supplying operands for said instructions,
   (c) control means connected to said pipeline stages and operative upon detection of a dependency between a first instruction and a second, subsequent instruction, for causing the second instruction to be abandoned and for initiating a look-ahead mode of operation,
   (d) means connected to said pipeline stages and to said control means, and operative in the look-ahead mode, for allowing instructions subsequent to said second instruction to continue to be executed so as to prefetch any operands for said instructions into the data slave store, without allowing said instructions subsequent to said second instruction to be fully executed, and
   (e) means connected to said pipeline stages and to said control means, and operative when a data slave store access is initiated to retrieve data required for resolving said dependency, but before the data is actually available, to terminate the look-ahead mode, and to re-start execution at said second instruction.

* * * * *